(12) United States Patent
Wang

(10) Patent No.: US 9,409,520 B1
(45) Date of Patent: Aug. 9, 2016

(54) AUTOMOTIVE RUNNING BOARD

(71) Applicant: Hsiang-Ting Wang, Yongkang Tainan (TW)

(72) Inventor: Hsiang-Ting Wang, Yongkang Tainan (TW)

( * ) Notice: Subject to any disclaimer, the term of this patent is extended or adjusted under 35 U.S.C. 154(b) by 0 days.

(21) Appl. No.: 14/645,455

(22) Filed: Mar. 12, 2015

(51) Int. Cl.
  *B60R 3/04* (2006.01)
  *B60R 3/00* (2006.01)
  *F16B 5/12* (2006.01)

(52) U.S. Cl.
  CPC ............... *B60R 3/002* (2013.01); *F16B 5/126* (2013.01)

(58) Field of Classification Search
  CPC .... B60R 3/002; B60R 3/04; B60R 2013/046; F16B 5/06; F16B 5/0607; F16B 5/0621; F16B 5/0642; F16B 5/0657; F16B 5/0664; F16B 5/10; F16B 5/12; F16B 5/126; Y10T 24/309; Y10T 24/44026; Y10T 24/45105
  USPC ............ 24/289, 297; 403/397, DIG. 14
  See application file for complete search history.

(56) References Cited

U.S. PATENT DOCUMENTS

| | | | | |
|---|---|---|---|---|
| 185,755 A * | 12/1876 | Kimbark | ............... | B60R 3/002 280/169 |
| 1,294,904 A * | 2/1919 | Hayne | ............... | B60R 3/002 280/169 |
| 1,382,507 A * | 6/1921 | Hayne | ............... | B60R 3/002 280/163 |
| 1,784,782 A * | 12/1930 | Bronson | ............... | B60R 3/002 280/169 |
| 1,862,131 A * | 6/1932 | Woolson | ............... | B60R 3/002 220/DIG. 3 |
| 4,451,063 A * | 5/1984 | Snyder | ............... | B60R 3/002 182/92 |
| 5,193,829 A * | 3/1993 | Holloway | ............... | B60R 3/007 280/163 |
| 5,769,439 A * | 6/1998 | Thompson | ............... | B60R 3/002 280/163 |
| 6,173,979 B1 * | 1/2001 | Bernard | ............... | B60R 3/002 280/163 |
| 6,581,946 B2 * | 6/2003 | Lund | ............... | B60R 3/002 280/163 |
| 6,709,137 B1 * | 3/2004 | Glovak | ............... | B60Q 1/323 362/495 |
| 6,916,145 B2 * | 7/2005 | Lydan | ............... | B29C 45/1635 249/63 |
| 7,131,655 B2 * | 11/2006 | Schumacher | ............ | B60R 3/002 280/163 |
| 7,287,770 B2 * | 10/2007 | Drabant | ............... | B60R 3/002 280/163 |
| 8,016,309 B2 * | 9/2011 | Flajnik | ............... | B60R 3/002 280/163 |
| 8,448,968 B1 * | 5/2013 | Grote | ............... | B60R 3/002 280/163 |
| 2007/0138757 A1 * | 6/2007 | Kuntze | ............... | B60R 3/002 280/163 |
| 2015/0377267 A1 * | 12/2015 | Morris | ............... | F16B 5/07 403/287 |

FOREIGN PATENT DOCUMENTS

| | | | | |
|---|---|---|---|---|
| DE | 202013103820 | * 11/2014 | ............ | F16B 5/0614 |
| EP | 1288075 A1 * | 3/2003 | ............ | B60R 3/002 |
| FR | 2865993 A1 * | 8/2005 | ............ | B60R 13/02 |

* cited by examiner

*Primary Examiner* — Glenn Dayoan
*Assistant Examiner* — Paul Chenevert
(74) *Attorney, Agent, or Firm* — Alan D. Kamrath; Kamrath IP Lawfirm, P.A.

(57) ABSTRACT

An automotive running board includes a base, a cover sheet, and a non-slip bar. The base is adapted to be mounted on a vehicle's lateral side and includes a top provided with at least one groove. The cover sheet is mounted on the top of the base and provided with a plurality of through-holes and a plurality of mounting holes. A plurality of support pillars is designed on a lower surface of the non-slip bar and correspondingly penetrates the through-holes of the cover sheet and resists the top of the base. A plurality of joint pillars is designed on the lower surface of the non-slip bar and correspondingly penetrates the mounting holes of the cover sheet, so that the non-slip bar securely joins the cover sheet. The running board featuring simple structure and reduced costs is easily assembled for better supportability and lowered yield loss rate.

7 Claims, 5 Drawing Sheets

AUTOMOTIVE RUNNING BOARD

BACKGROUND OF THE INVENTION

The present invention relates to a running board and, more particularly, to an auxiliary running board adapted to be installed on a vehicle's lateral side.

In general, a vehicle having a door opening high above the ground (e.g., sports utility vehicle, van, etc.) is laterally provided with running boards on which passengers tread to get on or off the vehicle. A conventional running board usually includes a base (running board body) and a cover sheet over the base, both of which are made of aluminum alloy. The cover sheet has an upper surface which is decorated with non-slip patterns for slip resistance and electroplated for aesthetic appearance.

A conventional automotive running board, however, features many low-strength components which take more time for assembling. Moreover, an aluminum-alloy base is manufactured with a costly mold and has an extended length which causes the molded base to be shrunk or deformed easily. In addition, the yield loss rate of elongated aluminum-alloy cover sheets in an electroplating process is high.

BRIEF SUMMARY OF THE INVENTION

It is an objective of the present invention to provide an automotive running board which effectuates good slip resistance and is easily assembled for better supportability and lower yield loss rate.

To achieve this and other objectives, an automotive running board of the present invention includes a base, at least one cover sheet, and at least one non-slip bar. The base is adapted to be installed on a vehicle's lateral side and includes a top. The cover sheet is mounted on the top of the base and includes a plurality of through-holes and a plurality of mounting holes therein. Each through-hole extends from a top surface of the cover sheet to a bottom surface of the cover sheet. The non-slip bar is engaged on the top surface of the cover sheet and includes a lower surface facing the top surface of the cover sheet. A plurality of support pillars and a plurality of joint pillars are provided on the lower surface of the non-slip bar. The plurality of support pillars correspondingly penetrates the through-holes of the cover sheet and resists the top of the base, and the plurality of joint pillars correspondingly penetrates the mounting holes of the cover sheet so that the non-slip bar securely joins the top surface of the cover sheet.

In an embodiment, at least one groove is formed in the top of the base and extends in a longitudinal direction of the base. The plurality of joint pillars extends into the groove in the top of the base. A snap-fit portion is formed at a lower end of each of the plurality of joint pillars and coupled with the bottom surface of the cover sheet.

In an embodiment, the base is an aluminum extrusion frame, and the cover sheet is made of plastic and has an electroplated upper surface.

In an embodiment, a plurality of perforated sockets is formed in the cover sheet and spaced in the longitudinal direction. A plurality of fasteners respectively extends through the perforated sockets and locks into the groove in the top of the base to fix the cover sheet on the base. The non-slip bar further includes an upper surface opposite to the lower surface of the non-slip bar, and a plurality of spaced concave portions is designed in the upper surface of the non-slip bars.

The present invention will become clearer in light of the following detailed description of illustrative embodiments of this invention described in connection with the drawings.

DETAILED DESCRIPTION OF THE INVENTION

Figure 1:
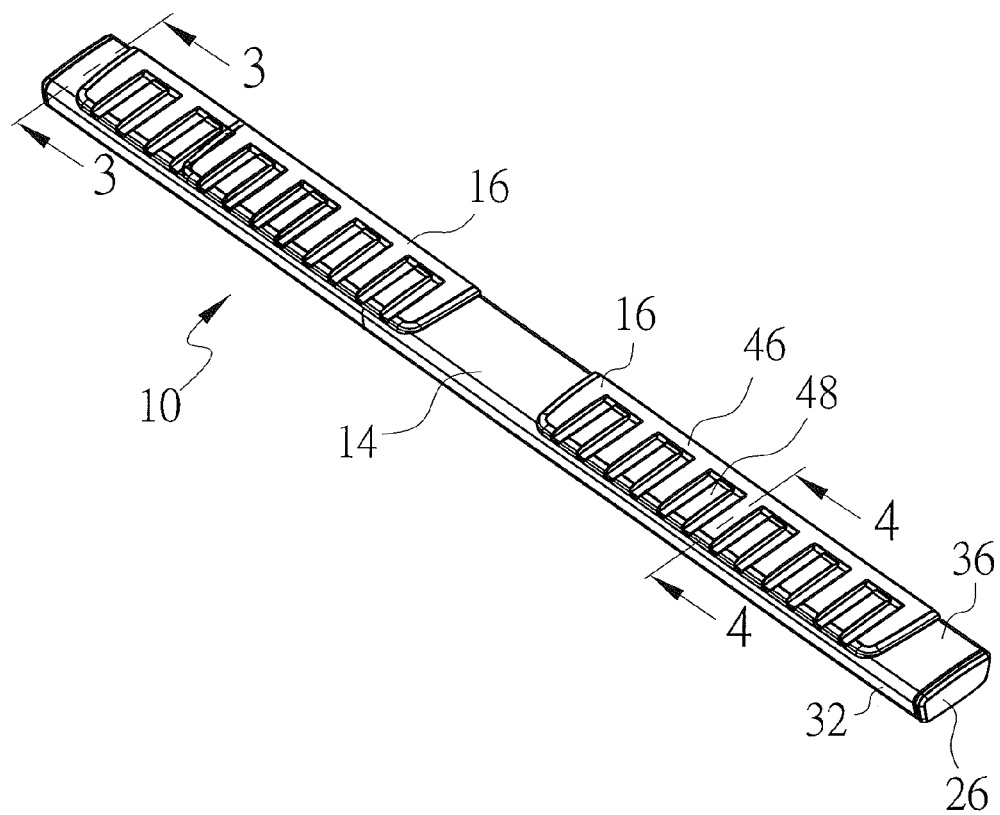
FIG. 1 is a perspective view of an automotive running board according to an embodiment of the present invention.
Figure 2:
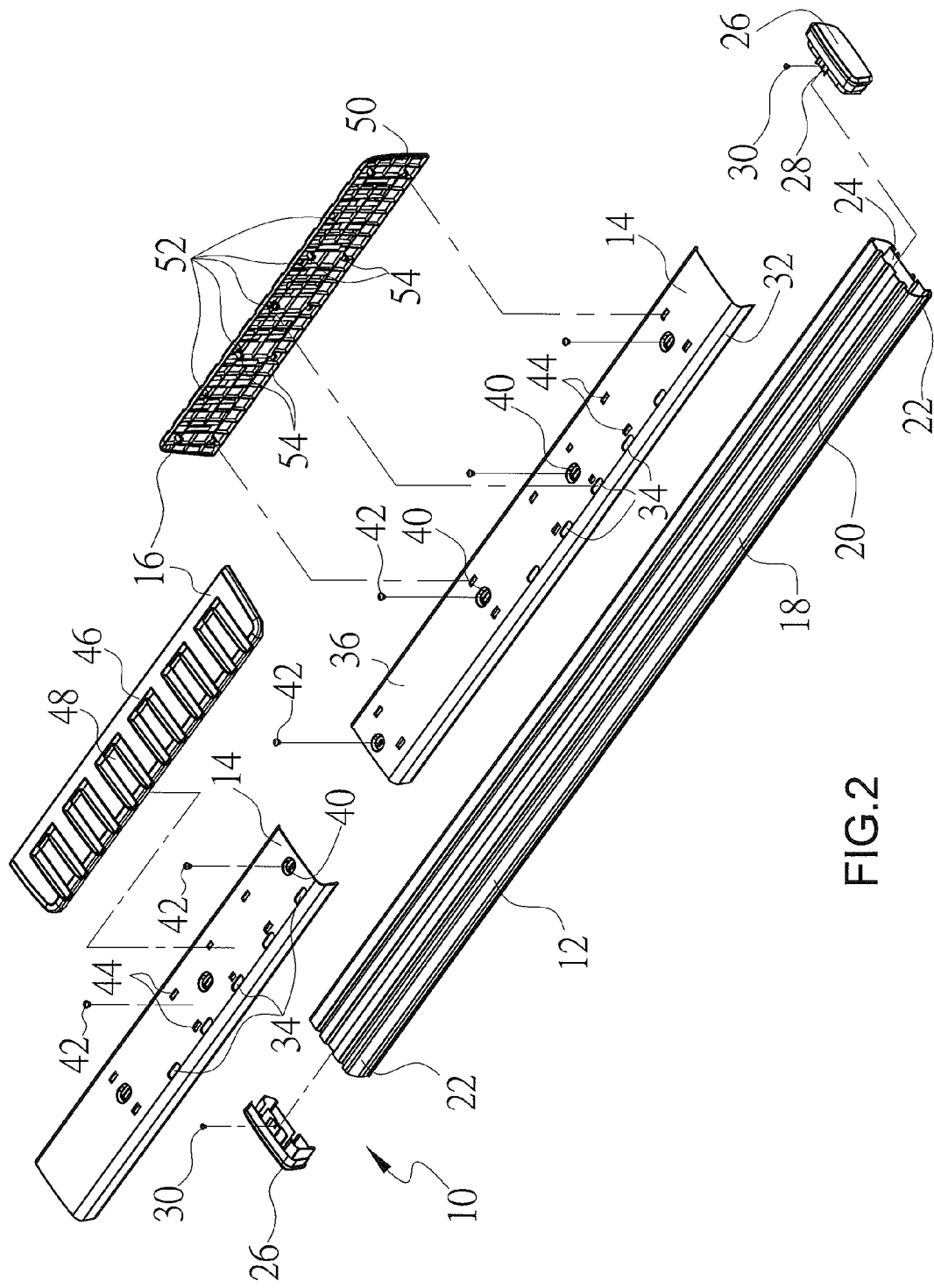
FIG. 2 is an exploded view of the running board of FIG. 1.
Figure 3:
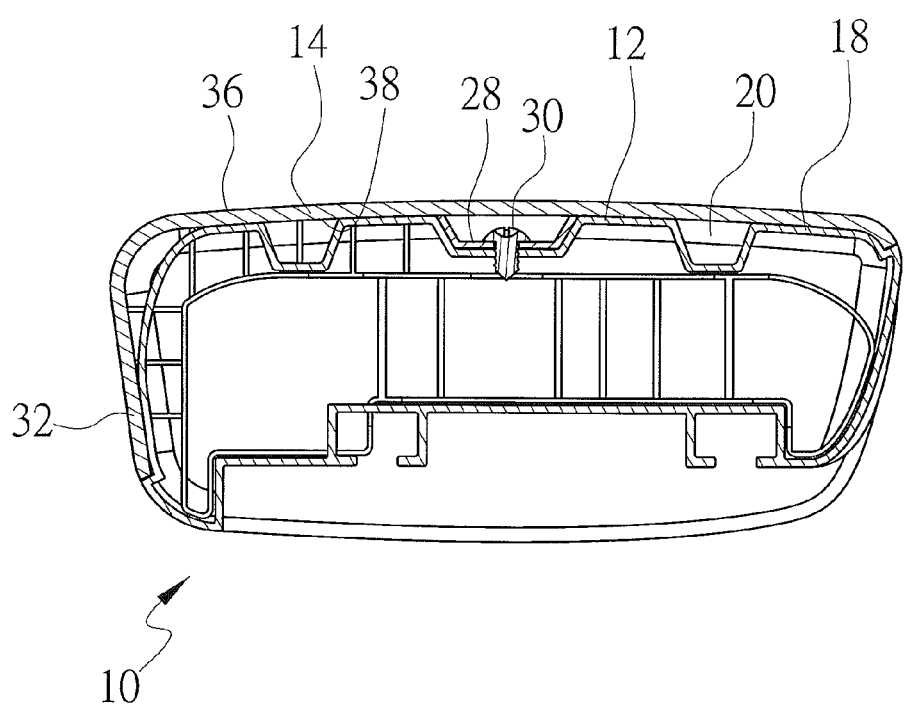
FIG. 3 is a sectional view taken along line 3-3 of FIG. 1.
Figure 4:
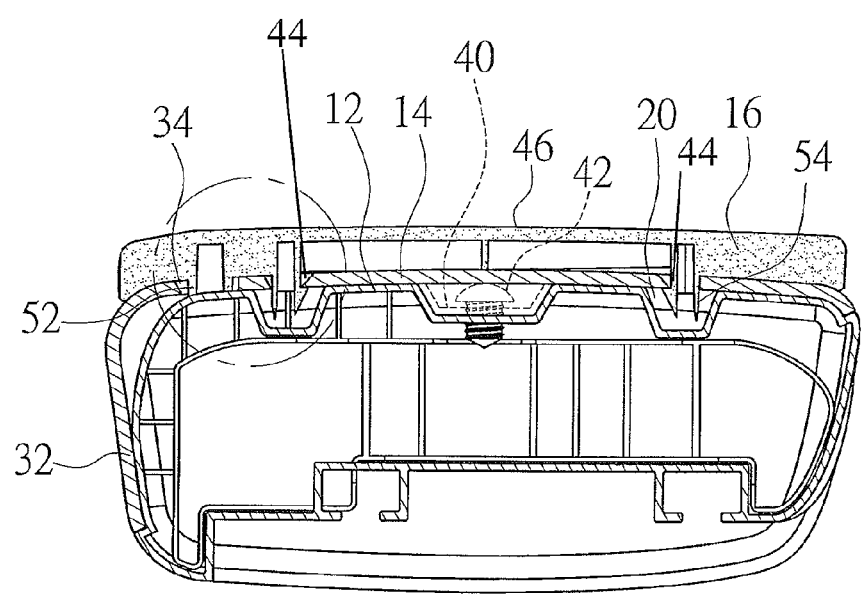
FIG. 4 is a sectional view taken along line 4-4 of FIG. 1.
Figure 5:
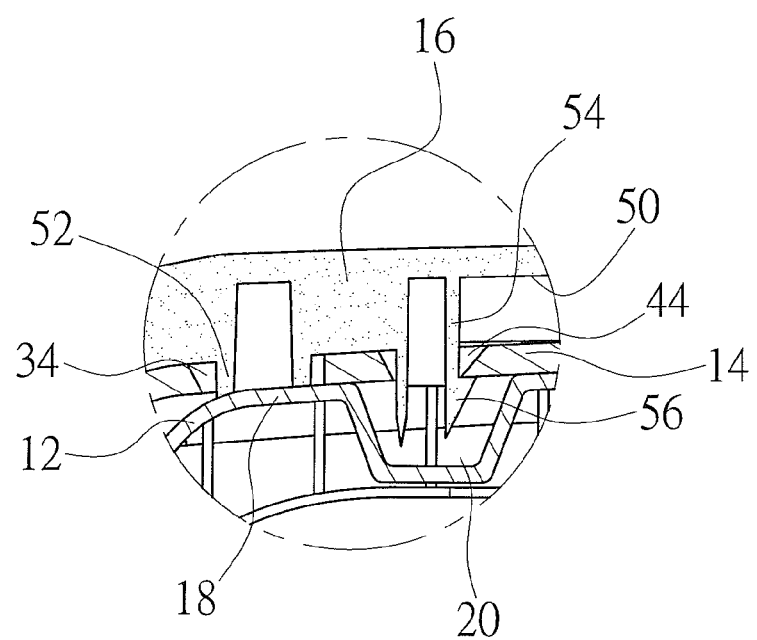
FIG. 5 is an enlargement view for a circle in FIG. 4.

An automotive running board according to an embodiment of the present invention is shown in FIGS. 1 through 5 of the drawings and generally designated 10. The running board 10 includes an elongated base 12, at least one cover sheet 14, and at least one non-slip bar 16. The base 12 is adapted to be mounted on a lateral side of a car body. In the embodiment, the base 12 is an aluminum extrusion frame including a top 18 with a plurality of grooves 20 formed in the top 18 and extending in a longitudinal direction of the base 12. The base 12 further includes two lateral ends 22 spaced in the longitudinal direction, and each lateral end 22 has an opening 24. Each opening 24 is covered with a side cap 26 inwardly developing a perforated socket 28 through which a screw 30 extends to lock into the top 18 of the base 12 so that the side cap 26 is securely fixed at the base 12 and seals one of the openings 24.

In this embodiment, the running board 10 includes two cover sheets 14 contiguously mounted on the top 18 of the base 12. In a practicable embodiment, the running board 10 includes one or a plurality of cover sheets 14. Each cover sheet 14 is made of plastic and has an electroplated upper surface. A leading edge 32 extends downward from a front end of each cover sheet 14 and covers a front end of the base 12. A plurality of through-holes 34 is formed in each cover sheet 14 and spaced in the longitudinal direction. The plurality of through-holes 34 is adjacent to the leading edge 32 and penetrated from a top surface 36 to a bottom surface 38 of the cover sheet 14. Further, a plurality of perforated sockets 40 is formed in the cover sheets 14 and spaced in the longitudinal direction. In this embodiment, the plurality of perforated sockets 40 is centrally distributed in the cover sheets 14. A plurality of fasteners 42 (such as screws) respectively extend through the perforated sockets 40 and lock into the grooves 20 in the top 18 of the base 12, so that the cover sheets 14 are fixed on the base 12 (see FIG. 4). Furthermore, each of the cover sheets 14 has a plurality of mounting holes 44.

In this embodiment, the running board 10 includes two non-slip bars 16 which are spaced from each other in the longitudinal direction and mounted on the top surfaces 36 of the cover sheets 14. In a practicable embodiment, the running board 10 includes one or a plurality of non-slip bars 16. A plurality of spaced concave portions 48 is designed in an upper surface 46 of each of the non-slip bars 16. In this embodiment, on a lower surface 50 of each of the non-slip bars 16 is designed a plurality of support pillars 52 and a plurality of joint pillars 54. The plurality of support pillars 52 correspondingly penetrates the through-holes 34 of the cover sheets 14 and resists the top 18 of the base 12 (see FIG. 5). The plurality of joint pillars 54 correspondingly penetrates the mounting holes 44 of the cover sheets 14 and extends into the grooves 20 in the top 18 of the base 12. A snap-fit portion 56 is formed at a lower end of each of the plurality of joint pillars 54 and coupled with the bottom surface 38 of the cover sheets 14 (see FIG. 5), so that the non-slip bars 16 can be securely mounted on the top surfaces 36 of the cover sheets 14.

With the running board 10 installed on a vehicle, the non-slip bars 16 with the concave portions 48 effectuate slip resistance and are treaded by passengers getting on/off the vehicle. Moreover, the non-slip bars 16 mounted on the top surfaces 36 of the cover sheets 14 shield the through-holes 34, the perforated sockets 40, and the mounting holes 44 of the cover sheets 14, reinforcing overall strength and aesthetics of the cover sheets 14.

The running board 10 of the present invention has advantages as follows:

1. The plurality of support pillars 52 of the non-slip bars 16 on which passengers tread resist the top 18 of the base 12 and enhance supportability of the running board 10.
2. The running board 10 with fewer components and screws installed has advantages of good strength and easy assembling.
3. The base 12 which is an aluminum extrusion frame is available to car models with different vehicle lengths, manufactured with one mold and less deformed in contrast to other conventional running board bases.
4. The cover sheets 14 are manufactured in a mature plastic electroplating process which effectively reduces the yield loss rate.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An automotive running board comprising:
a base adapted to be installed on a vehicle's lateral side and including a top;
a cover sheet mounted on the top of the base and including a plurality of through-holes, with each of the plurality of through-holes extending from a top surface of the cover sheet to a bottom surface of the cover sheet, with the cover sheet further including a plurality of mounting holes therein; and
a non-slip bar engaged on the top surface of the cover sheet and including a lower surface facing the top surface of the cover sheet, with a plurality of support pillars and a plurality of joint pillars provided on the lower surface of the non-slip bar, with the plurality of support pillars correspondingly penetrating the through-holes of the cover sheet and resisting the top of the base, with the plurality of joint pillars correspondingly penetrating the mounting holes of the cover sheet.

2. The automotive running board according to claim 1, wherein the base is an aluminum extrusion frame, and the cover sheet is made of plastic and has an electroplated upper surface.

3. The automotive running board according to claim 1, wherein at least one groove is formed in the top of the base and extends in a longitudinal direction of the base, with the plurality of joint pillars extending into the groove in the top of the base, with a snap-fit portion formed at a lower end of each of the plurality of joint pillars and coupled with the bottom surface of the cover sheet.

4. The automotive running board according to claim 3, wherein the base is an aluminum extrusion frame, and the cover sheet is made of plastic and has an electroplated upper surface.

5. The automotive running board according to claim 3, wherein a plurality of perforated sockets is formed in the cover sheet and spaced in the longitudinal direction, with a plurality of fasteners respectively extending through the perforated sockets and locking into the groove in the top of the base to fix the cover sheet on the base.

6. The automotive running board according to claim 3, wherein the non-slip bar further includes an upper surface opposite to the lower surface of the non-slip bar, with a plurality of spaced concave portions designed in the upper surface of the non-slip bars.

7. The automotive running board according to claim 3, wherein a leading edge extends downward from a front end of the cover sheet and covers a front end of the base, with the plurality of through-holes of the cover sheet spaced in the longitudinal direction and being adjacent to the leading edge.

* * * * *